United States Patent [19]

Stephens et al.

[11] 4,303,939
[45] Dec. 1, 1981

[54] HORIZONTAL STABILITY MEASUREMENT APPARATUS

[75] Inventors: Joseph W. Stephens, Plainfield; Kou-Jay Yang, Indianapolis, both of Ind.

[73] Assignee: RCA Corporation, New York, N.Y.

[21] Appl. No.: 176,789

[22] Filed: Aug. 11, 1980

[51] Int. Cl.³ .............................................. H04N 5/13
[52] U.S. Cl. ................................... 358/139; 358/148; 358/153; 358/128.6; 360/36
[58] Field of Search ........................ 358/139, 4, 8, 127, 358/128.6, 10, 153, 148; 360/36, 33, 25; 324/79 D

[56] References Cited

U.S. PATENT DOCUMENTS 3,829,612  8/1974  Beyers, Jr. ..................... 178/6.6 A
3,940,556  2/1976  Boltz, Jr. ........................ 178/6.6 R
4,158,857  6/1979  Hiraguri .............................. 358/139

*Primary Examiner*—John C. Martin

*Attorney, Agent, or Firm*—E. M. Whitacre; J. S. Tripoli; R. G. Coalter

[57] ABSTRACT

Horizontal synchronizing pulses are separated from a composite video signal and applied to a detector for producing an error signal representative of the timebase error of each pulse relative to a timebase reference having a period of approximately one horizontal line. Changes in the error signal are inhibited when the time period between pulses differs substantially from one line. Peak values of a given frequency component of the error signal are detected and averaged to provide an output signal manifestation representative of the frequency, amplitude and grouping of the timebase errors and which is relatively unbiased by pulses having a period substantially different from the period of the timebase reference. The apparatus may be used, illustratively, for quality control purposes and timebase error source identification in video disc mastering, replication and playback apparatus as well as for measurement of the effectiveness of timebase correction apparatus.

18 Claims, 3 Drawing Figures

HORIZONTAL STABILITY MEASUREMENT APPARATUS

This invention relates to horizontal stability measurement apparatus for detecting timebase errors of the horizontal synchronizing component of a composite video signal. The invention is particularly useful as a diagnostic and quality control tool in video disc mastering and pressing systems.

Timebase errors may be introduced at any one of several points in a video disc mastering system. The mastering signal source, for example, may introduce a timebase error characteristic of either the media being reproduced (e.g., film, tape, etc.) or of the mechanics of the reproducer (e.g., tape playback unit, film scanner, etc.). Speed variations of the mastering turntable as well as vertical distortions and alignment variations of the center hole of the disc can also introduce instabilities of the horizontal synchronizing pulse upon playback of the pressed disc. Another source of timebase error is the substrate, mode or disc playback unit where errors can be caused, for example, by misalignment of the disc, drive motor speed variations, etc.

An aspect of the invention resides in the discovery that not all horizontal timebase error spectra present on a recorded disc are equally objectionable to a viewer when the disc is played back. It was determined during one viewer test that over a frequency range up to about 1 KHz the most objectionable jitter frequency occurred at approximately the picture field rate (e.g., about 60 Hz in the NTSC system) while errors at other frequencies (such as 30 Hz) could be twice as great before being objectionable. For this reason, knowledge of the timebase error spectral distribution is important. Knowing the distribution function of objectionable error conditions, one may then arrive at appropriate weighting functions for each frequency band of interest in setting quality control limits.

Conventional methods of spectrum analysis are not well suited to performing the task of the present invention. The reason is that video signals reproduced from disc or tape media tend to exhibit certain characteristics of both a coherent and an incoherent nature which tend to bias the result of the measurement. A coherent bias may be introduced during the vertical interval of the video signal as a result of the presence of equalizing pulses which occur at double the normal horizontal sweep rate. An incoherent or random source of bias may be encountered at any point within a video frame whenever synchronizing pulses are masked by noise or loss of signal. Another aspect of the invention, which also concerns weighting of the horizontal timebase error component, is that a viewer's perception of an error as objectionable or not depends upon its duration as well as its amplitude and frequency. It has been found that the setting of quality control limits based purely upon the weighted peak amplitude of the spectral distribution of errors results in an objectionable and unwarranted conservative bias. It has been found, for example, that some timebase errors may be of very great amplitude and occur in the most objectionable frequency range and yet still be acceptable from a viewer's standpoint if the error grouping is sufficiently brief.

The present invention is directed to meeting the need for horizontal timebase stability measurement apparatus which is relatively insensitive to the biasing effects noted above and which provides an output signal manifestation which takes into account parameters, such as amplitude, frequency and duration or grouping of timebase errors.

In accordance with the invention, stability measurement apparatus for detecting timebase errors of the horizontal synchronizing pulse component of a video signal includes first means for separating the horizontal synchronizing pulses from the video signal and second means for producing an error signal representative of the timebase error of each pulse relative to a timebase reference having a period of substantially one horizontal line. Third means are provided for detecting and averaging peak values of a predetermined frequency component of the error signal to provide an output signal manifestation representative of the frequency, amplitude and grouping of the timebase errors.

In accordance with a further aspect of the invention, means are provided for inhibiting a change in the error signal when the time period between pulses differs from one line by a predetermined amount.

In accordance with another aspect of the invention, means are provided for inhibiting a change in the error signal when the time period between pulses falls within a predetermined range of values, one of the values being equal to one half line.

In accordance with yet another aspect of the invention, the composite signal is derived from an FM carrier wave by means of an FM demodulator, means are provided for detecting variations of a parameter of the carrier wave beyond predetermined limits to produce a carrier wave defect indicating signal and means are provided for inhibiting a change in the error signal when the carrier wave defect indicating signal is present.

The above and further features of the invention are described in detail hereinafter and illustrated in the accompanying drawings wherein like elements are identified by like reference designators and in which.

Figure 1:
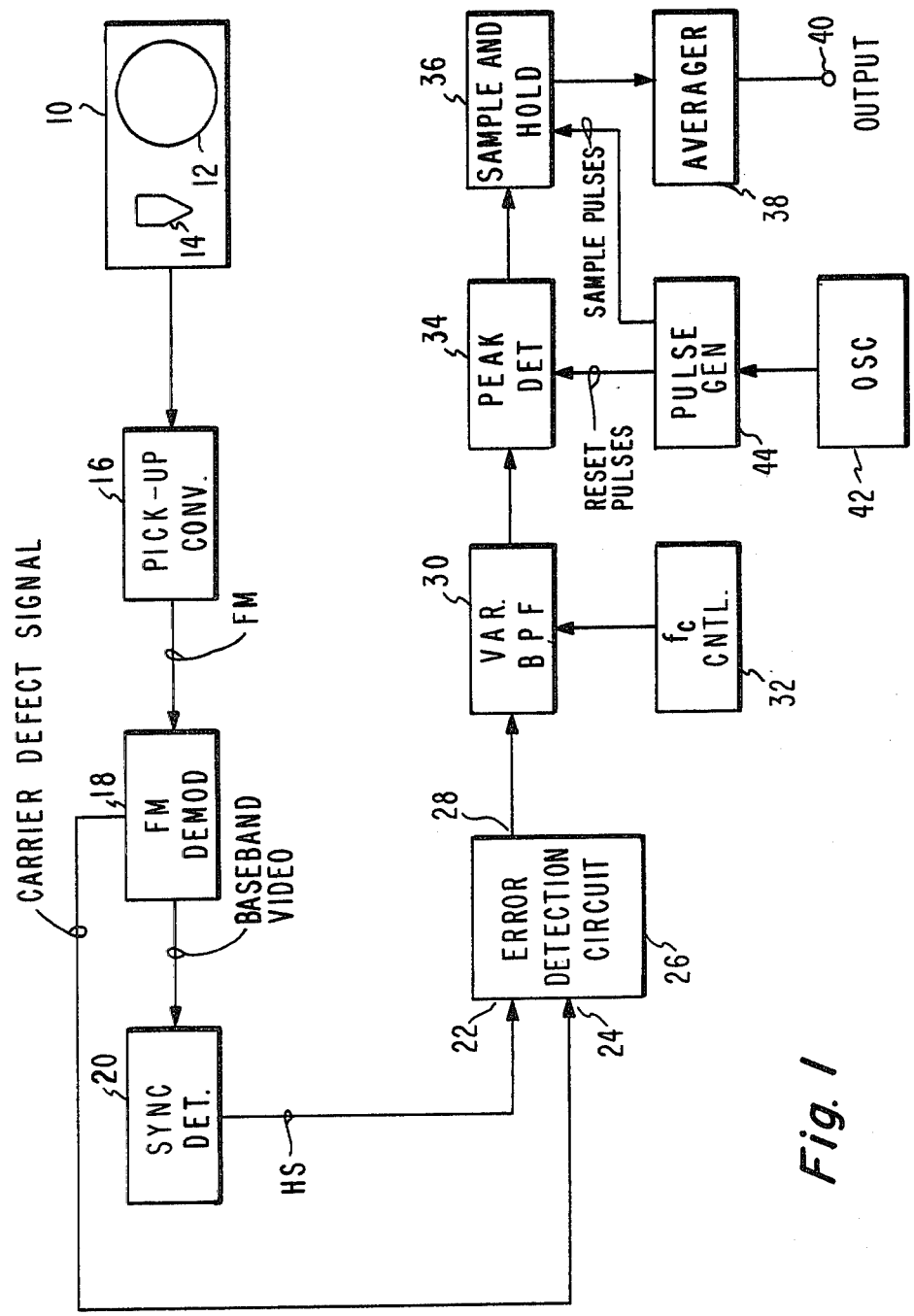
FIG. 1 is a block diagram of a video disc quality control test system employing horizontal time base stability measurement apparatus embodying the invention.

The system of FIG. 1 comprises a turntable mechanism 10 for rotating a video disc 12 and a pickup transducer 14 for recovering video information from the disc. Illustratively, it will be assumed that the disc is of a type in which information is stored in the form of topological variations and recovered by sensing capacitance variations between transducer 14 and the disc 12. The disc 12 may be either a pressed record or it may be a disc mode from which stampers are formed for pressing the record. The disc may also be an original or master substrate from which the disc mold is formed. If so, transducer 14 should be of the non-contact type (e.g., an optical pickup device such as a laser) to avoid damage to the relatively soft substrate material.

When playing back finished pressed discs, the output of transducer 14 is applied to the input of a pickup converter 16 which comprises a capacitance-to-voltage converter responsive to capacitance variations between a stylus in transducer 14 and the disc being played for producing an FM output signal voltage representative of the recorded video information. Suitable circuits for implementing the capacitance-to-voltage conversion function of pickup converter 16 are well known. See, for example, U.S. Pat. No. 3,783,196, entitled "HIGH-DENSITY CAPACITIVE INFORMATION RECORDS AND PLAYBACK APPARATUS THEREFORE" which issued to T. O. Stanley, Jan. 1, 1974; U.S. Pat. No. 3,972,064 entitled "APPARATUS AND METHODS FOR PLAYBACK OF COLOR PICTURE/SOUND RECORDS" which issued to E. O. Keizer, July 27, 1976; and U.S. Pat. No. 3,711,641 entitled "VELOCITY ADJUSTING SYSTEM" which issued to R. C. Palmer, Jan. 16, 1973. When playing back discs with a light beam, converter 16 would be of the type which produces an FM signal based on detected light intensity variations.

The FM video signal produced by converter 16 is demodulated to baseband by means of an FM demodulator 18. Illustratively, demodulator 18 may be of the pulse counting type or of the phase lock loop (PLL) type and preferably includes means for detecting defects of the FM signal (e.g., excessive carrier deviation, insufficient amplitude, etc.) to provide a carrier defect indicating output signal. A suitable pulse counting type of FM demodulator is disclosed in U.S. Pat. No. 4,038,686 entitled "DEFECT DETECTION AND COMPENSATION" which issued to A. L. Baker, July 26, 1977. An FM demodulator of the phase lock loop type is described in the U.S. Patent application, Ser. No. 948,013, now U.S. Pat. No. 4,203,134, of T. J. Christopher, et al., entitled "FM SIGNAL DEMODULATOR WITH DEFECT DETECTION" which was filed Oct. 2, 1978.

Figure 2:
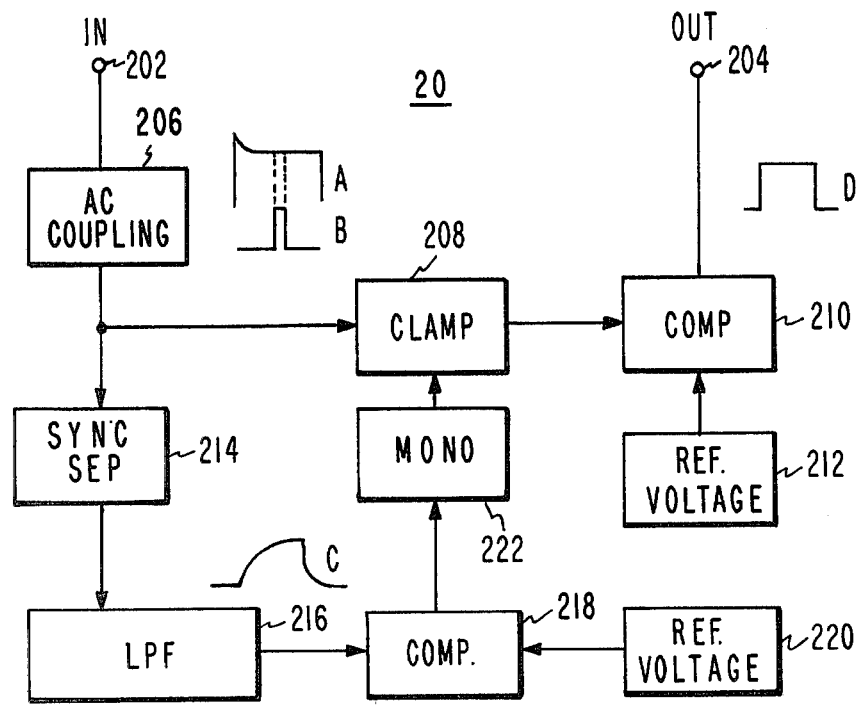
FIG. 2 is a block diagram of a preferred horizontal synchronizing pulse generator suitable for use in the apparatus of FIG. 1.

Horizontal synchronizing pulses (hereinafter "HS pulses") are separated from the video signal by means of a sync detector 20. The detector may be of conventional design but preferably is of a type which exhibits negligible timebase errors so that the output signal of the stability measurement apparatus of FIG. 1 is not colored or biased to any significant extent by the characteristics of detector 20. One possible source of timebase error, insofar as detector 20 is concerned, is that one may expect that the average value of the video signal will vary with picture content. Another problem is that it is conventional practice in video disc applications to apply preemphasis to the luminance signal component for signal-to-noise ratio enhancement and this preemphasis can lead to overshoots of the HS pulse. See, generally, U.S. Pat. No. 4,096,513 entitled "COLOR VIDEO SIGNAL PROCESSING CIRCUITS" which issued to M. D. Ross, June 20, 1978 and the U.S. Patent Application of T. J. Christopher, Ser. No. 020,334, entitled "PREEMPHASIS AND CLIPPING APPARATUS FOR REDUCING DISTORTIONS" filed Mar. 14, 1979, now abandoned. A preferred implementation of detector 20 which is relatively insensitive to variations of the average video signal amplitude and which is also relatively unaffected by HS pulse overshoots due to luminance preemphasis is shown in FIG. 2 and will be discussed subsequently.

The HS pulses produced by sync detector 20 and the defect signal produced by demodulator 18 are applied to the inputs 22 and 24, respectively, of an error detection circuit 26. Circuit 26 comprises means for producing an error signal at the output 28 thereof which is representative of the timebase error of each HS pulse relative to a timebase reference having a period of substantially one horizontal line and means for inhibiting a change in the error signal when the time period between HS pulses deviates from 1-H by more than a small fraction of 1-H such as a percent or so. It has been found that rejection of HS pulse timebase errors longer or shorter than 1-H by about one microsecond is adequate to prevent undesired biasing of the output signal by both the extra HS pulses. (e.g., equalizing pulses) present during the first nine lines of the vertical interval of the video signal (NTSC video format) and also avoids unpredictable effects on the output signal which could otherwise be caused by missing HS pulses (e.g., pulses made by noise).

Figure 3:
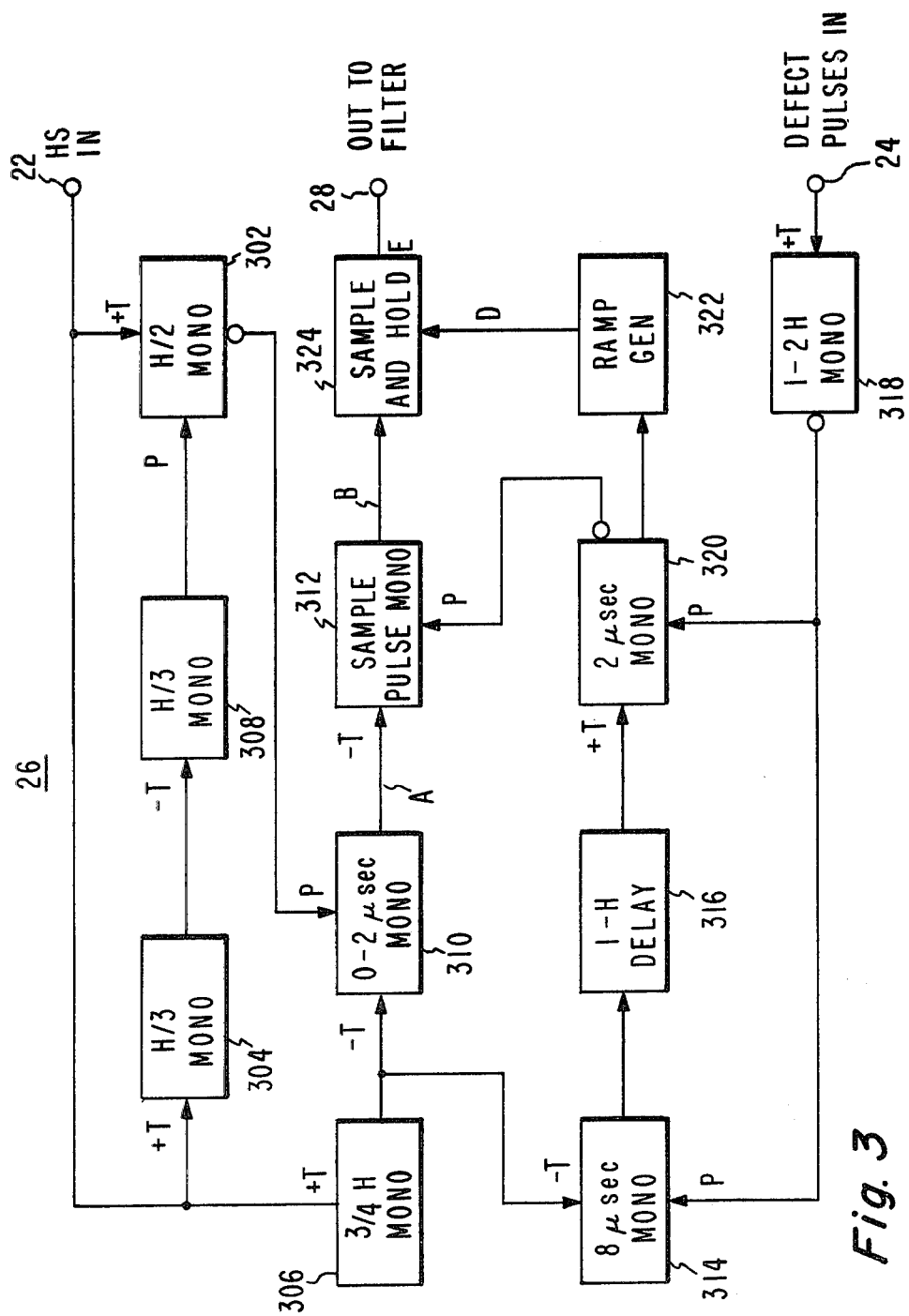
FIG. 3 is a block diagram of a preferred form of error detection circuit for use in the apparatus of FIG. 1.

In video disc or video tape applications one may expect that signal dropouts may occasionally occur and that some of the signal dropouts may last for several lines. In such a case, the FM demodulator may produce noise having random components occasionally spaced about 1-H apart which could be erroneously interpreted as valid HS pulses. This possible source of measurement error is precluded by additional inhibit circuitry within detector 26 which inhibits a change in the error signal produced at output 28 whenever a defect indicating signal is applied to input 24. A preferred implementation of error detection circuit 26 is shown in FIG. 3 and described subsequently.

The timebase error signal at output 28 of circuit 26 is applied to a variable bandpass filter 30 the center frequency of which is controlled by $f_c$ control circuit 32. Filter 30 could be implemented by means of a passive filter set in which case circuit 32 could be a selector switch for coupling a desired filter of the set to peak detector 34. Highly selective passive bandpass filters, however, are relatively expensive and bulky for frequencies in the range where horizontal timebase errors are most objectionable (e.g., 1–500 Hz). For this reason it is preferred that filter 30 be an active filter such as the type 762BQ10 device manufactured by Frequency Devices Incorporated which covers the range of 0.5–500 Hz and is electronically programmable. Control 32 could comprise manual switches as previously mentioned but preferably comprises electronic switches so that filter 30 may be controlled automatically by a signal source such as a paper tape reader, a computer or some other suitable signal source.

The function of filter 30 is to separate the error signal produced by detector 26 into individual spectral components. For purposes of analysis of video disc quality and identification of horizontal timebase error sources it has been found that the bandwidth of filter 30 should be about one tenth octave at each frequency setting. Other bandwidths may be selected depending upon the degree of error frequency resolution desired in a given application.

The signal produced at the output of filter 30 meets two of the objects of the invention, namely, it is representative of the HS pulse error spectral content and it is not biased to any significant extent by factors such as extra or missing HS pulses or by long period signal dropouts. As previously explained, however, timebase error signal amplitude and frequency alone are insufficient parameters for judging the quality of the signal source (in this case, a video disc).

Additional factors which must be considered are the duration or grouping of the timebase errors and the peak error amplitude per disc revolution. Peak detector 34 detects peak values of the error signal frequency component produced at the output of filter 30, sample and hold circuit 36 periodically samples the output of detector 34 and holds the sampled signal and averager 38 averages the output signal of sample and hold circuit 36 to provide a timebase error output signal to terminal 40.

Control of peak detector 34 and sample and hold circuit 36 is provided by an oscillator 42 and a pulse generator 44. Oscillator 42, which may be a conventional design, supplies a relatively low frequency control signal to pulse generator 42. A preferred control signal frequency choice is on the order of the "once around" frequency of the turntable rotating video disc 12. Illustratively, for a turntable speed of 450 rpm oscillator 42 may be set to a frequency of about 7.5 Hz. Pulse generator 42 (which illustratively may comprise a pair of cascade connected monostable multivibrators triggered by oscillator 42) supplies a sample pulse to sample and hold circuit 36 then supplies a reset pulse to peak detector 34 once each cycle of oscillator 42. By this means the greatest peak error signal produced by filter 30 during one revolution of disc 12 is accumulated in peak detector 34, transferred to sample and hold circuit 36 and then detector 34 is reset and the cycle is repeated.

Illustratively, peak detector 34 may comprise a diode coupled between the output of filter 30 and one plate of a capacitor the other plate of which is grounded. Resetting of the peak detector may be accomplished by connecting the conduction path of a transistor in parallel with the capacitor and applying the reset pulses to the transistor base electrode. In order to avoid errors due to the diode voltage drop it is preferable that the diode be compensated by some means. A preferred way of providing diode voltage drop compensation is to connect the diode in the feedback loop of an operational amplifier as shown, for example, in "Operational Amplifiers, Design and Application" published by McGraw Hill Book Company, 1971, pp. 355 et seq. Examples of sample and hold circuits and of diode-less peak detectors suitable for use in the apparatus of FIG. 1 may be found in "Application of Operational Amplifiers, Third Generation Techniques" published by The McGraw Hill Book Company in 1973, pp. 132 et seq. Averager 38 may comprise a simple lowpass filter such as a resistance-capacitance filter. Preferably the filter time constant should be substantially greater e.g., 1 second) than the period of oscillator 42 or the rotational velocity of disc 12 whichever is longer.

In a practical application of the system of FIG. 1 the center frequency of filter 30 may be changed manually and the signal at output terminal 40 can be measured and plotted as a function of the filter 30 setting thereby generating a graph representative of the spectral distribution of the average value of the peak HS pulse timebase errors of the video signal recorded on disc 12. As previously explained, such a graph may be used for identification of disc faults (an out of round disc will exhibit a strong component at the once-around frequency) as well as mastering equipment problems. For example, if pressed discs show a significant frequency component which is also found in the disc molds one may suspect that a problem exists earlier in the manufacturing process.

Also, as previously mentioned, the invention may be used for testing the effectiveness of timebase correction servo systems in video disc players. In such a case, turntable mechanism 10 of FIG. 1 would be replaced by a video disc player and two measurements could be made, one with the player timebase correction servo enabled and the other with it disabled. By comparing the two graphs produced under those conditions, one can quantatively determine the effectiveness of the player timebase correction servo system as a function of frequency by noting the differences between the spectral components.

It is advantageous in either disc or player servo system testing to automate the system of FIG. 1. This may be readily accomplished if filter 30 is of a type as previously described which is electrically controllable. One way of automating the system would be to use a suitably programmed computer to control the center frequency of filter 30 via circuit 32 while measuring the output signal at terminal 40 and either printing or plotting the error amplitude versus frequency information. For production line quality control testing where only a "go" or "no-go" type of indication is needed, terminal 40 could be connected to a comparator for comparing the error signal with a reference level signal representative of the maximum allowable value error signal. As previously explained, however, a viewer's perception of tolerable HS pulse errors is a function of several variables. Accordingly, the reference level signal should be appropriately "weighted" or adjusted with each setting of filter 30 to account for these perceptional effects.

Other uses of the stability measurement apparatus of FIG. 1 will be readily apparent to one of skill in the art such as measurement of tape timing errors, camera or film scanner errors, transmission equipment errors, etc.

In FIG. 2 sync detector 20 comprises an input terminal 202 for receiving the baseband video signal produced by demodulator 18 and an output terminal 204 for supplying HS pulses to error detection circuit 26. The d.c. component of the video signal is removed by means of an AC coupling circuit 206 (e.g., a capacitor) connected between terminal 202 and the input of a clamp circuit 208 which, under control of a clamping signal supplied to its other input, periodically clamps the central portion of the sync pulse tip to a reference level (e.g., ground) thereby establishing a d.c. reference level for the sync tip of the video signal which meets two criteria. First the reference level is independent of the picture content of the video signal and second the referenece level is not influenced by overshoots of the HS pulse due to preemphasis of the luminance component of the signal. Waveform A illustrates the overshoot of the HS pulse and waveform B illustrates the timing relationship of the clamp pulse supplied to clamp circuit 208 relative to the HS pulse. Illustratively the clamp pulse has a width of about one microsecond and is delayed relative to the leading edge of the HS pulse by about two and one half microseconds.

The "d.c. restored" signal produced at the output of clamp circuit 208 is applied to a comparator 210 for comparison with a reference voltage produced by a reference voltage source 212. The output of comparator 210 is coupled to terminal 204 for supplying detected HS pulses thereto. Source 212 should be adjusted to a value approximately midway between the burst level and the sync tip clamping level of the video signal produced at the output of clamp 208. If burst has been removed from the video signal (e.g., by comb filtering) then reference voltage source 212 may be set to a value about midway between the sync pedestal (or blanking level) and the sync tip clamping level.

The delayed clamping signal for controlling clamp 208 is generated by first separating the HS pulse component at the output of AC coupling circuit 206 from the video signal by means of a sync separator or sync "stripper" 214, delaying and smoothing the stripped HS pulses by means of a lowpass filter 216, comparing the stripped, smoothed and delayed HS pulse (waveform C) in a comparator 218 with a reference voltage produced by a reference voltage source 220 and applying the comparator 218 output signal to clamp 208 via a monostable multivibrator 222. Preferably, the time constant of filter 216 is selected such that comparator 218 is not triggered by the equalizing pulses present during the vertical interval. A suitable time constant for filter 216 would be about 1.3 microseconds when measuring the timebase error of NTSC signals.

Filter 216 may comprise an R-C type lowpass filter and preferably includes an adjustable resistance element to allow setting of the filter cutoff frequency to a value such that the filter delay is about two and one half microseconds. The period of multivibrator 222 determines the width of the clamp pulse (waveform B) and illustratively may be on the order of a microsecond or so. The delay times and periods associated with filter 216 and multivibrator 222 are a function of the width of the HS pulse standard in various video systems. The values noted have been found suitable for video signals containing HS pulses having a width conforming to the NTSC standard. Appropriate changes should be made if the video signal source contains HS pulses having a width conforming to some other standard such as PAL or SECAM.

Error detection circuit 26 of FIG. 3 includes a number of monostable multivibrators (hereinafter "monos") some of which are positive edge triggered and others of which are negative edge triggered. To signify the difference, positive triggered mono inputs are identified by "+T" and negative triggered mono inputs are identified by a "−T". A positive logic convention is assumed and negated or complemented mono outputs are signified by circles. Some monos have priming inputs signified by "P". The convention used herein is that a high level or true logic signal applied to a priming input P will condition the mono to assume its quasi-stable state upon subsequent application of a trigger signal to its trigger input. Conversely, a low level or false logic signal applied to a P input will inhibit triggering of the mono.

Monostable multivibrators having positive and negative trigger inputs, true and complemented outputs and priming inputs are well known. A suitable monostable multivibrator having these features is the type 9602 integrated circuit manufactured by American Micro Devices, Inc., and also by Fairchild Camera and Instrument Corporation.

A further convention used in FIG. 3 is that the letter H means a time period substantially equal to one horizontal line.

Input terminal 22, which receives the HS pulses from sync detector 20, is connected to the positive trigger inputs of monos 302, 304 and 306. The true output of mono 304 is applied to the negative trigger input of mono 308 which is connected at the true output thereof to the priming input of mono 302. The negative trigger input, priming input and true output of mono 310 are connected, respectively, to the true output of mono 306, the complemented output of mono 302 and the negative trigger input of sample pulse mono 312. The negative trigger input, the true output and the priming input of mono 314 are connected, respectively, to the true output of mono 306, the input of delay element 316 and the complemented output of mono 318. The positive trigger input, the complemented output, the true output and the priming input of mono 320 are connected, respectively, to the output of delay element 316, the priming input of mono 312, the control or enabling input of a ramp generator 322 and the complemented output of mono 318. The positive trigger input of mono 318 is connected to terminal 24 for receiving the defect indicating pulses produced by FM demodulator 18. A sample and hold circuit 324 is connected at the sample pulse input, the sample signal input and the output thereof, respectively, to the true output of mono 312, the ramp signal output of ramp generator 322 and output terminal 28.

Delay element 316, as will be explained, provides the principle timebase reference of 1-H for detection of HS pulse variations and for this reason should be of a type exhibiting high stability. It may be implemented by either digital means (e.g., a counter or a shift register clocked by a stable signal source such as a crystal controlled oscillator) or by analog means. A preferred analog implementation would comprise a glass delay line such as the type DL45 made by Amperex Corporation. The model DL45 line has a delay of about 63.5 microseconds which is substantially equal to the NTSC and PAL 525/60 standards for one (color) line period. For other TV standards 1-H is slightly different (e.g., about 63.9 microseconds in the PAL 625/50 standard, 64.0 microseconds in the SECAM standard). Preferably, delay element 316 should be chosen to correspond to the particular video format of the signal being processed. This is not essential, however, as such slight errors in the absolute value of the delay may be compensated for by appropriate adjustment of the period of mono 310 as will be explained.

The quasi-stable state period of each mono is shown in the drawing in terms of either H or microseconds with the exception of the sample pulse mono 312. The period of this mono should be substantially less than that of mono 320 (2 microseconds). Very short period pulses may be obtained with the aforementioned type 9602 integrated circuit by not connecting a timing capacitor between its timing capacitor terminals. The actual period is not critical but should satisfy the inequality condition noted above.

Ramp generator 322 may be implemented by digital means (e.g., a combination of a resettable counter and a digital to analog converter such as an R-2R ladder) or by analog means such as a capacitor arranged to be charged (or discharged) by a constant current source controlled by the output of mono 320. Sample and hold circuit 324 may also be of conventional design such as a transmission gate arranged to charge a holding capacitor to the ramp voltage produced by ramp generator 322 when enabled by the narrow sample pulses produced by mono 312. Examples of fast settling high accuracy sample and hold circuits are given in the aforementioned text "Applications of Operational Amplifiers, Third Generation Techniques".

In operation, monos 302, 304 and 308 function as a detector for producing an inhibit signal which prevents a change in the error voltage produced at output terminal 28 during the vertical interval of the video signal being tested. This advantageously prevents the equalizing pulses present during the first nine lines of the vertical interval from being interpreted by the detector as erroneous HS pulses and thus eliminates this possible source of bias from the detector output signal. The principle of operation is that the time period between equalizing pulses is about one half line (H/2). Monos 304 and 308 generate a priming signal during the central third of one line (e.g., from H/3 to 2H/3) which conditions mono 302 to be triggered if any subsequent HS pulse falls within that time period.

As an illustration, when an HS pulse is applied to terminal 22 mono 304 will be triggered and will assume its quasi-stable state for one third of a line period (H/3). Mono 308 also has a period of H/3 and is triggered when mono 304 returns to its stable state. Since mono 302 is primed by mono 308, mono 302 will be triggered whenever another HS pulse is applied to terminal 22 during the central third of one line period (i.e., H/3 to 2H/3). This occurs during the vertical interval since equalizing pulses have a period of H/2 which falls within the middle of the priming signal produced by mono 308. When mono 302 is triggered its complemented output goes low thereby removing the priming signal from mono 310. In its unprimed condition mono 310 cannot be triggered and thus interrupts the flow of sampling signals to sample and hold circuit 324 thereby preventing a change in output voltage at terminal 28.

The choice of H/3 for the periods of monos 304 and 308 provides a relatively wide time period or "window" for testing for double HS pulses (i.e., equalizing pulses. This provides a very high probability of detection of even severely distorted equalizing pulses. One may, however, alter the "window" width if desired by appropriately changing the period of mono 308. If this is done the period of mono 304 should be changed in the opposite sense and by an amount so as to maintain the "window" position centered with respect to H/2. As an example, if the period of mono 308 (which controls the "window" width) is decreased to H/6 then the period of mono 304 (which controls the "window" position) should be changed to 5H/12.

Mono 306 provides the function of delaying the HS pulses by three quarters of a line to provide adequate time for the vertical interval detector circuit (monos 304, 308, 302) to make a determination of the presence or absence of vertical interval equalizing pulses. It should be noted that the period of mono 306 (3H/4) is greater than the sum of the periods of monos 304 and 308 (2H/3). The period of mono 306 could equal the sum of the periods of monos 304 and 306 but the greater period (3H/4) is preferred to allow for tolerance variations of the monos thereby eliminating the need for precise adjustment of the timing relationships involved.

Timebase errors are measured in the detector of FIG. 3 by delaying the HS pulse by 1-H and measuring the time difference between the delayed and nondelayed pulses. The delay is provided by delay element 316 and the comparison is provided by generating a ramp voltage which varies monotonically from a first level to a second level in response to the pulses produced by delay element 316 and sampling and holding the ramp voltage in response to the pulses supplied to delay element 316. As will be explained subsequently, means are also provided for inhibiting a change in the error signal when the error exceeds predetermined limits and also when FM carrier defects are detected by FM demodulator 18.

In more detail, the HS pulses (delayed by ¾H by mono 306 as previously described) are applied to the input of delay element 316 via mono 314 and to the sampling input of sample and hold circuit 324 via the cascade connection of monos 310 and 312. The output pulses from delay element 316 trigger mono 320 which has a period substantially less than 1-H (in this example, 2 microseconds) which, in turn, enables ramp generator 322 to produce a monotonic and preferably linear output ramp voltage. The ramp voltage is then sampled by means of sample and hold circuit 324 in response to sample pulses which are delayed by mono 310 relative to the pulses supplied to element 316 by one half of the period of mono 320 (e.g., 1 microsecond).

If the period between HS pulses is exactly equal to the 1-H delay provided by element 316 and if the period of mono 310 is exactly one half the period of the ramp controlling mono 320, then sample pulses will be supplied to sample and hold circuit 324 at a time when the ramp voltage is exactly one half of its peak to peak value. Any variation of the HS pulse period would then result in a proportional variation of the sample pulses time relative to the ramp voltage and cause a proportional change in the stored voltage.

As a practical matter one may expect that the absolute value of the delay of element 316 may differ slightly from 1-H. If so, the error detector would exhibit an asymmetrical probability of detection of timebase errors. This problem is solved by making the delay of mono 310 adjustable. As an example, assume that delay element 316 exhibits a delay which is longer than 1-H by 500 nanoseconds. If the delay of mono 310 remained at 1 microsecond then the sampling pulses would arrive 500 nanoseconds early relative to the center of the voltage ramp. This may be compensated for by adjusting mono 310 to provide an additional 500 nanoseconds of delay. The preferred setting of mono 310, in other words, is one half the ramp voltage width plus the delay error of element 316. It is not necessary in making this adjustment, however, to know what the error of element 316 is or, for that matter, is it necessary to know the exact delay of mono 320 if one has access to a source of accurate HS pulses. If so, the adjustment can be made simply by varying the period of mono 310 until the output voltage of sample and hold circuit 324 equals half the ramp voltage.

HS pulses which have a timebase error which does not fall within a range of values defined by mono 320 and delay element 316 are rejected by the connection of the complemented output of mono 320 to the priming input of sample pulse mono 312. This connection inhibits the operation of mono 312 at all times other than when mono 320 is in its quasi-stable state (i.e., when ramp generator 322 is activated). Since mono 312 generates the sample pulses for sample and hold circuit 324, the effect of HS pulse timebase errors which lie outside the limits of the "window" or time period when mono 320 is active is to prevent sampling of the ramp voltage. Accordingly, the output voltage of sample and hold circuit 324 will remain unchanged under such conditions.

Monostable 318 disables monos 314 and 320 for a period of time between one and two lines whenever a "defect" is detected in the FM demodulator. This prevents a change in the output voltage of sample and hold circuit 324 which might otherwise result if noise components produced by the demodulator happened to fall within the period of time mono 320 is active.

What is claimed is:

1. Stability measurement apparatus for detecting timebase errors of the horizontal synchronizing pulse component of a video signal, said apparatus comprising:
   first means for separating horizontal synchronizing pulses from said video signal;

second means for producing an error signal representative of the timebase error of each pulse relative to a timebase reference having a period of substantially one horizontal line; and third means for detecting and averaging peak values of a predetermined frequency component of said error signal to provide an output signal manifestation representative of the frequency, amplitude and grouping of said timebase errors.

2. Apparatus as recited in claim 1 further comprising:
means for inhibiting a change in said error signal when the time period between pulses differs from one line by a predetermined amount.

3. Apparatus as recited in claim 1 further comprising:
means for inhibiting a change in said error signal when the time period between pulses falls within a predetermined range of values, one of said values being equal to one half line.

4. Apparatus as recited in claim 1 further comprising:
means for deriving said video signal from an FM carrier wave signal supplied thereto;
means for detecting departures of a parameter of said FM carrier wave beyond predetermined limits for producing an FM carrier wave defect indicating signal; and
means for inhibiting a change in said error signal in response to said FM carrier wave defect indicating signal.

5. Apparatus as recited in claim 1 wherein said third means comprises:
filter means responsive to said error signal for producing a bandpass filtered output signal;
peak detector means for detecting the peak value of said filtered outut signal;
sample and hold means fo periodically sampling and holding the peak values of said error signal produced by said peak detector means; and
averaging means for averaging the sampled and held peak values of the error signal to provide said output signal manifestation.

6. Apparatus as recited in claim 1 wherein said second means comprises:
delay means having delay of substantially one horizontal line;
means for supplying said horizontal synchronizing pulses to an input of said delay means;
means for deriving delayed pulses from an output of said delay means; and
output means responsive to the pulses supplied to and derived from said delay means for producing said error signal.

7. Apparatus as recited in claim 6 wherein said output means comprises:
first circuit means for producing an output signal manifestation which changes monotonically from a first value to a second value within a predetermined time period when activated by a first control signal supplied thereto;
memory circuit means responsive to a second control signal for sampling and storing said output signal manifestation of said first means; and
means for deriving one of said control signals from said horizontal synchronizing pulses supplied to said delay means and for deriving the other of said control signals from said delayed pulses derived from said output of said delay means.

8. Apparatus as recited in claim 7 wherein said first control signal is a binary signal having a first level for activating said first circuit means and a second level for deactivating said first circuit means and further comprising means for inhibiting said second control signal when said first control signal is at said second level.

9. Apparatus as recited in claim 1 wherein said video signal is a preemphasized video signal, said horizontal synchronizing pulses tending to exhibit overshoot due to the preemphasis and wherein said first means comprises:
clamp circuit means responsive to an enabling signal supplied thereto for clamping said preemphasized video signal to a reference voltage source to provide a d.c. restored output signal;
comparator means for comparing said d.c. restored output signal with a predetermined reference voltage for producing said separated horizontal synchronizing pulses; and
means responsive to said preemphasized video signal for supplying said enabling signal to said clamping circuit means for a predetermined time and delayed by a predetermined amount relative to the leading edge of each pulse, the amount of delay being greater than the pulse overshoot period.

10. Apparatus as recited in claim 1 wherein said third means comprises:
bandpass filter means responsive to said error signal for producing a bandpass filtered output signal;
means for peak detecting said bandpass filtered output signal and averaging the resultant peak detected signal to provide said output signal manifestation; and
circuit means coupled to said bandpass filter means for controlling the center frequency thereof.

11. Stability measurement apparatus for detecting timebase errors of the horizontal synchronizing pulse component of a video signal, said apparatus comprising:
first means for separating horizontal synchronizing pulses from said video signal;
second means for producing an error signal representative of the timebase error of each pulse relative to a timebase reference having a period of substantially one horizontal line;
third means for preventing a change in said error signal when the time period between pulses differs from one line by a predetermined amount;
fourth means for preventing a change in said error signal when the time period between pulses falls within a predetermined range of values, one of said values being equal to one half line; and
fifth means for detecting and averaging peak values of a predetermined frequency component of said error signal to provide an output signal manifestation representative of the frequency, amplitude and grouping of said timebase errors.

12. Apparatus as recited in claim 11 further comprising:
means for deriving said video signal from an FM carrier wave signal supplied thereto;
means for detecting departures of a parameter of said FM carrier wave beyond predetermined limits for producing an FM carrier wave defect indicating signal; and
means for inhibiting a change in said error signal in response to said FM carrier wave defect indicating signal.

13. Apparatus as recited in claim 12 wherein said fifth means comprises:

filter means responsive to said error signal for producing a bandpass filtered output signal;

peak detector means for detecting the peak value of said filtered output signal;

sample and hold means for periodically sampling and holding the peak values of said error signal produced by said peak detector means; and averaging means for averaging the sampled and held peak values of the error signal to provide said output signal manifestation.

14. Apparatus as recited in claim 12 wherein said second means comprises:

delay means having delay of substantially one horizontal line;

means for supplying said horizontal synchronizing pulses to an input of said delay means;

means for deriving delayed pulses from an output of said delay means; and output means responsive to the pulses supplied to and derived from said delay means for producing said error signal.

15. Apparatus as recited in claim 14 wherein said output means comprises:

first circuit means for producing an output signal manifestation which changes monotonically from a first value to a second value within a predetermined time period when activated by a first control signal supplied thereto;

memory circuit means responsive to a second control signal for sampling and storing said output signal manifestation of said first means; and means for deriving one of said control signals from said horizontal synchronizing pulses supplied to said delay means and for deriving the other of said control signals from said delayed pulses derived from said output of said delay means.

16. Apparatus as recited in claim 15 wherein said first control signal is a binary signal having a first level for activating said first circuit means and a second level for deactivating said first circuit means and wherein said third means comprises means for inhibiting said second control signal when said first control signal is at said second level.

17. Apparatus as recited in claim 12 wherein said video signal is a preemphasized video signal, said horizontal synchronizing pulses tending to exhibit overshoot due to the preemphasis and wherein said first means comprises:

clamp circuit means responsive to an enabling signal supplied thereto for clamping said preemphasized video signal to a reference voltage source to provide a d.c. restored output signal;

comparator means for comparing said d.c. restored output signal with a predetermined reference voltage for producing said separated horizontal synchronizing pulses; and means responsive to said preemphasized video signal for supplying said enabling signal to said clamping circuit means for a predetermined time and delayed by a predetermined amount relative to the leading edge of each pulse, the amount of delay being greater than the pulse overshoot period.

18. Apparatus as recited in claim 11 wherein said fifth means comprises:

bandpass filter means responsive to said error signal for producing a bandpass filtered output signal;

means for peak detecting said bandpass filtered output signal and averaging the resultant peak detected signal to provide said output signal manifestation; and circuit means coupled to said bandpass filter means for controlling the center frequency thereof.

* * * * *